April 15, 1969  E. B. SEELEY  3,438,254
FLUID FLOW DETECTOR
Filed Oct. 19, 1965
Fig. 1
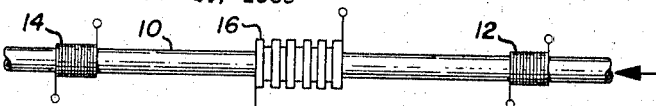
Fig. 2
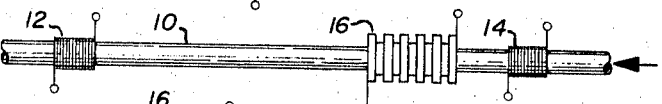
Fig. 3
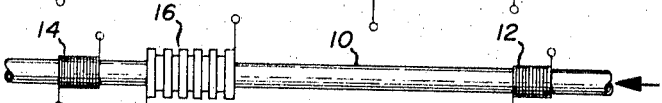
Fig. 4
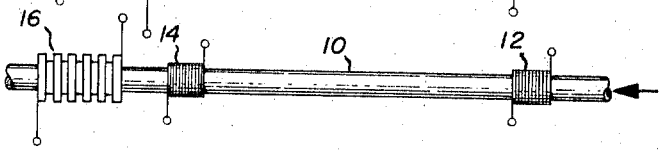
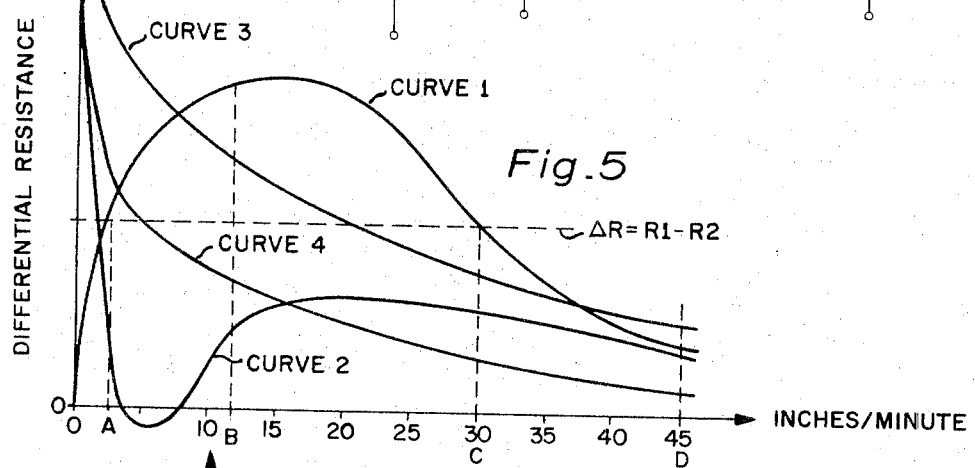
Fig. 5
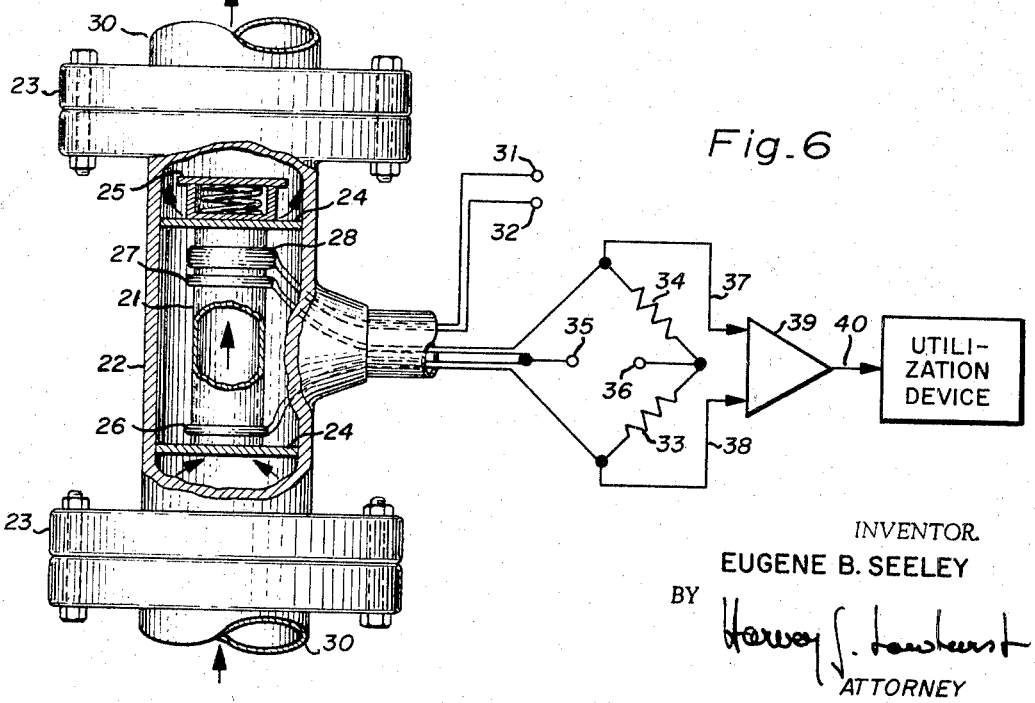
Fig. 6
INVENTOR.
EUGENE B. SEELEY
BY
ATTORNEY United States Patent Office 3,438,254
Patented Apr. 15, 1969

3,438,254
FLUID FLOW DETECTOR
Eugene B. Seeley, Bellevue, Wash., assignor, by mesne assignments, to United Control Corporation, Redmond, Wash., a corporation of Delaware
Filed Oct. 19, 1965, Ser. No. 497,863
Int. Cl. G01f 1/00
U.S. Cl. 73—204        8 Claims

ABSTRACT OF THE DISCLOSURE

A fluid flow detector in the form of a flow tube having an upstream and a downstream distributed temperature sensitive element placed around the tube, and, further, having a distributed heating element placed around the tube downstream of the downstream temperature sensitive element.

---

The present invention relates generally to a fluid flow detector and more particularly to a detector capable of providing an indication of a "no fluid flow" condition in a pipe or conduit.

For some time now, a number of attempts have been made to automate the oil well equipment used for pumping crude petroleum in order to reduce production costs. One essential device in the automation process is a reliable monitor of fluid flow or fluid flow detector for installation on every oil well delivery line, at the point where it enters a collecting line or storage tank. One use of such a flow detector is to provide an indication, in the form of a "no flow" signal, of a serious failure of the delivery line by breakage or plugging, failure of the surface pump through a power failure, motor burnout, mechanical failure, etc., and of failure of the well itself. The purpose of such an indication is to enable the oil well operators to take corrective action when a "no flow" condition exists and to ignore an oil well until a "no flow" signal is received.

Presently available flow detection devices have not proven entirely adequate for this purpose. Mechanical flow detectors are either insensitive at low flow rates or susceptible to being jammed by entrained sand. Differential pressure meters have insufficient sensitivity unless small and therefore easily plugged orifices are used. Presently known thermal type flow meters have been successfully used to measure flow rates of single fluid compositions, but when used with oil well producing equipment, they produce many false indications since the pumped fluid is generally non-homogeneous and the components have different thermal and hydraulic characteristics. Typically, oil wells produce a fluid flow which comprises a water and oil mixture of widely varying ratios.

Another use for the flow detector of the present invention is to monitor the flow of what is referred to as "part time" wells, and to permit the flow detector to control the well pump. "Part time" wells are those which produce intermittently if pumped continuously and produce just as much if pumped intermittently. To reduce cost and to provide more efficient pumping, the well pump is turned off on a signal from the flow detector when a "no flow" condition exists for a selected time interval.

The preferred embodiment of the flow detector of this invention comprises two distributed temperature sensitive elements which are placed around the outside of a flow tube such that each is exposed to the average temperature caused by flow of the fluid in the tube. In the preferred embodiment of the present invention, the downstream temperature sensing element is heated above fluid ambient temperature at "no flow" and at low flow, by conduction along the tube wall and by local heating of the fluid film in the vicinity of the temperature sensing element. The upstream temperature sensing element measures essentially the unheated fluid ambient temperature. The difference in the temperature, as sensed by the two elements, is thus a function of the flow rate, and when the outputs from the two temperature sensing elements are connected to a differential amplifier, a flow detector results.

One object of the present invention is to provide a flow detector which is extremely sensitive to any fluid flow over a large range of viscosity, temperature and pressure in gas, oil, water and sand mixtures.

A principal feature of the present invention is the arrangement of the heater and temperature sensing elements in such a manner that an indication of flow is provided over a large flow rate range.

It is another object of the present invention to provide a sensing means which is isolated and fully protected from the fluid whose flow is to be monitored.

Another object of the present invention is to provide a flow detector that is responsive over an extremely broad range of flowing material having solid, liquid and gas components.

Another object of the present invention is to provide a flow detector which utilizes a check valve to limit convection currents at "no flow" or "low flow" conditions in a water-oil mixture so that errors due to convection currents of low viscosity components of the mixture are avoided.

Still another object of the present invention is to provide a flow detector which has an inclined or vertical orientation to enable bulk heating of the top fluid at a "no flow" condition.

Further objects and advantages of the present invention will become apparent to those skilled in the art to which the invention pertains as the ensuing description proceeds.

The features of novelty that are considered characteristic of this invention are set forth with particularity in the appended claims. The organization and method of operation of the invention itself will best be understood from the following description when read in connection with the accompanying drawing in which:

FIGURE 1 is a schematic diagram showing one arrangement of a heater and a pair of temperature sensing elements in a flow detector constructed in accordance with the present invention;

FIGURE 2 is an alternative arrangement of the combination of FIGURE 1;

FIGURE 3 is another alternative arrangement of the combination of FIGURE 1;

FIGURE 4 is the preferred arrangement of the combination of FIGURE 1;

FIGURE 5 shows four flow rates versus differential resistance curves useful in explaining the mode of operation for each of the arrangements illustrated in FIGURES 1 through 4; and FIGURE 6 is a partially cut-away view of one form of the flow detector of this invention and a schematic circuit diagram of the electrical sensing circuit.

Referring now to the drawing, in which like reference characters designate like elements, FIGURE 1 illustrates a pipe or conduit 10, suitable for passing a fluid flow entering from the right as indicated by the arrow. A pair of temperature sensitive elements 12 and 14, preferably in the form of temperature sensitive resistance wire, are closely wound around pipe 10 at two different locations which are respectively referred to as downstream and upstream. A heating element 16, suitable for raising the ambient temperature of at least the fluid film immediately adjacent to the pipe wall, and the pipe wall itself, is positioned midway between temperature sensing elements 12 and 14.

If the resistance of temperature sensing element 12 is $R_2$ and the resistance of temperature sensitive elements 14 is $R_1$, and if $R_2$ is selected equal to $R_1$, then at "no flow" the differential resistance will be zero, and any change in the differential resistance will indicate a flow condition.

In operation of the flow detector shown in FIGURE 1, the resulting differential resistance $\Delta R = R_1 - R_2$ is a function of the flow rate as shown in curve 1 of FIGURE 5. As is immediately apparent from curve 1, the differential resistance is equal to zero at the "no flow" condition which is readily explained due to the symmetrical location of heater element 16. As fluid flow starts, the resistance of element 12 decreases while the resistance of element 14 increases since fluid, at the ambient temperature, cools pipe 10 at the point of entry and absorbs heat from pipe 10 as it flows downstream.

It is also seen that, as the flow rate increases, the differential resistance will first increase very steeply and then more gradually, and, after reaching a maximum, decrease. This decrease is due to the fact that for large fluid flow rates, less heat is carried to downstream sensing element 14. As shown by curve 1, the differential resistance is approximately the same at points A and C which may respectively correspond to a flow rate of 3 and 30 inches per minute.

The arrangement of a flow detector shown in FIGURE 1 is suitable for the detection of small flow rates, say up to flow rates indicated by B in FIGURE 5, since it has great sensitivity in the lower region. However, in systems, where the flow rate may widely vary between rates indicated as A and C, the device would be less useful since, if adjusted to show a "no flow" condition below a flow rate equal to A, then it will likewise show a "no flow" condition when the flow rate is above C.

FIGURE 2 shows a flow meter having an unsymmetrically located heater element 16 which biases its adjacent sensing element 14 to a high resistance $R_1$ at "no flow." The curve obtained by plotting differential resistance against flow rate is shown by curve 2 of FIGURE 5. From curve 2, it is immediately seen that as fluid flow starts, the effect of the conduction path through the tube wall is reduced by the moving fluid and the gradient shows great sensitivity for low flow rates. As the heated fluid eventually reaches the downstream sensing element, causing it to increase its resistance, a point is reached where the resistance of both elements is the same which occurs at a flow rate of approximately 4 inches per minute (for an embodiment having a curve as shown in FIGURE 5). Thereafter, a reversal of the differential resistance takes place and the resistance differential increases. The comments made in connection with the flow meter arrangement as shown in FIGURE 1 apply here likewise. The configuration shown in FIGURE 2 is useful for the detection of very low flow rates, say below 3 inches per minute, or for higher flow rates, say above 8 inches per minute, but not for both.

The embodiment of the flow meter shown in FIGURE 3 is similar to that shown in FIGURE 2 except that heating element 16 is placed immediately adjacent the upstream side of downstream sensing element 14. The reason for interchanging sensing elements 12 and 14 is only made for the purpose of a direct comparison between the different embodiments since the output device has been selected to provide a "no flow" signal only when $R_1$ exceeds $R_2$ except in the case of the embodiment shown in FIGURE 1. In other words, comparison in this manner may be made without reversing polarity.

Curve 3 of FIGURE 5 shows the differential resistance versus flow rate of the flow meter embodiment shown in FIGURE 3. As seen from curve 3, the sensitivity at low flow rates is much less when contrasted with the sensitivity of curves 1 and 2, but for increase of flow rates, the sensitivity curve does not exhibit a significant reversal in its gradient. The reason for this is that upstream resistance element 12 remains substantially at ambient temperature except when there is no flow where it is heated slightly by conduction, whereas downstream sensing element 14 is exposed to conduction and to the heated fluid film, and it will require very large flow rates to reduce the temperature of this film to ambient temperature. Accordingly, the embodiment shown in FIGURE 3 is highly suitable as a flow detector over a large range of flow rates except that its sensitivity is very poor for small flow rates.

Referring now to FIGURE 4, there is shown the preferred arrangement of sensing elements 12 and 14 and heating element 16 in which the heating element is positioned on the downstream side of the downstream sensor element. Curve 4 of FIGURE 5 shows the variation of differential resistance with flow rate and indicates a general shape similar to that shown by curve 3 except that it has a much greater sensitivity at low flow rates. The reason for the increased sensitivity is that downstream sensing element 14 is primarily affected by heater 16 while upstream sensing element 12 remains substantially at the ambient temperature of the fluid through pipe 10.

As will be explained hereinafter, the configuration of FIGURE 4 is also least sensitive to oil-water mixture ratios with a check valve installed into the downstream portion, and will detect "no flow" of 100% water when inclined in an upward direction.

FIGURE 6 shows an embodiment of the flow detector of this invention utilizing essentially the arrangement of elements shown in FIGURE 4. A flow sensing tube 21 made of, for example, an 8-inch length 1½-inch diameter stainless steel pipe, is shown mounted within a section of standard 3-inch pipe 22. Pipe 22 is provided with a conventional flange 23 on either end thereof for mating with a similar flange of a standard 3-inch pipeline 30, used in the transmission of oil or other fluids. Flow sensing tube 21 is mounted within pipe 22 by a pair of flanges 24 secured, as by welding, to each end of flow sensing tube 21 and to the inner wall of pipe 22. A check valve 25, made of stainless steel for example, is mounted to the downstream opening of flow sensing tube 21 by suitable means. Tube 21, pipe 22 and flanges 24 comprise a transducer arrangement to increase the flow rate of fluid therethrough with respect to the fluid flow rate through the pipeline.

A first sensing element 26 is positioned around flow sensing tube 21 adjacent the upstream end and a second sensing element 27 is positioned around tube 21 near the exit or downstream end. Sensing elements 26 and 27 may be thermocouples, thermistors, resistance wires, bi-metallic strips or other commercially available devices which are temperature sensitive. In the preferred embodiment of the flow detector, sensing elements 26 and 27 take the form of a temperature sensitive resistance wire having a high positive temperature coefficient which is wound around tube 21 typically 60 times (60 turns) and occupies an axial length of about one-quarter inch. In this manner, the sensing elements are of the distributed type and provide an average temperature instead of being of the point type which makes it subject to variation in case crude oil sticks to the wall or the like.

A heater 28, suitable for raising the ambient temperature of at least the portion of fluid passing through tube 21 in contact with the tube surface, is positioned around tube 21 between downstream sensing element 27 and the exit portion of tube 21. Electrical power for heater 18 is applied to heater leads 31 and 32 from a suitable power supply (not shown). Typically, the heater wire occupies an axial length of one-half inch or more.

Sensing elements 26 and 27 are connected to a pair of resistors 33 and 34 to form a bridge circuit therewith. A source of voltage (not shown) is connected across bridge terminals 35 and 36, and the other two bridge terminals 37 and 38 connected to the two input terminals of a differential amplifier 39, having an output lead 40. Output lead 40 is connected to a suitable utilization device which may be an alarm bell or indicator which provides a failure indication at the "no flow" condition, or a control device which turns off the oil pumping means for a predetermined period of time when a "no flow" condition is encountered.

Operation of the present invention is as follows: The flow detector is connected to the output pipeline of, for example, a producing oil well. The detector (flow tube 21), in its preferred mode of operation, is positioned at or near a collecting line or storage tank and is inclined upwardly so that its axis makes an angle of 45° to 90° with the horizontal. Power is supplied to heater 28 and to the bridge circuit by a suitable electrical power means.

Assuming first that a flow condition exists, oil or water and sand, or a mixture thereof, enters the flow transducer section of the detector comprising pipe 22 and flow sensing tube 21. Since sensing tube 21 is of smaller diameter than pipe 22, the velocity of the fluid is increased as it flows through tube 21. This increase in fluid flow velocity provides a self-purging action over an extreme range of viscosities and acts to prevent crude petroleum from clinging in thick layers to the sensing surfaces of tube 21, thus reducing the possibility of false "no flow" signals.

Distributed sensors 26 and 27 provide output voltages which are proportional to their resistance effected by the temperature due to fluid flow. These output voltages are connected to differential amplifier 39 which produces an output voltage proportional to their difference. There are small variances in the difference of the output voltages for the same flow, depending on the oil-water mixture of the fluid, but relative to the intended usages of the instrument, the differences are not significant.

As the flow decreases, the resistance difference increases and the voltage output on lead 40 also increases. As a practical matter, resistors 33 and 34 are adjusted during the "no flow" condition so that the output voltage on lead 40 has a selected value, usually zero.

Check valve 40 modifies the flow pattern past downstream sensor 27 and heater 28 to increase the flow rate near the sensing surface at low total flows thus improving sensitivity while not significantly affecting pressure drop across the valve at high flow rates. Also, check valve 40, together with the inclined position of tube 21, prevents convection currents, usually present with low viscosity fluids such as water, from giving erroneous output readings.

Let us now assume a "no flow" condition exists. The detector output is adjusted (via resistors 33 and 34) to provide a selected output level. As flow starts, the voltage output from the differential amplifier increases to its highest (may be negative) level.

In order to obtain similar detector output voltages with flow of either 100% oil, 100% water or various water-oil ratios, it is necessary to limit convection currents in water at "no flow" when the water to oil mixture ratio exceeds about 4 to 1. This is accomplished by the check valve. Without a check valve in tube 21, the difference between the resistances in 100% water is approximately 8 ohms versus 40 ohms for 100% oil. With the check valve installed, the resistance difference for water at "no flow" is about 30 ohms or greater.

With regard to spacing between the heater and the sensors, the heater is located a sufficient distance downstream to avoid heating the upstream sensor above ambient temperature during flow. The downstream sensor is located close to the heater such that it is heated by both conduction through the tube wall as well as by bulk fluid temperature rise. In addition, the separation of the two sensors must be adequate (considering conduction along tube wall) to give rise to a "no flow" differential resistance at no flow with the sensing tube empty (gas filled). With the tube empty, the upstream sensor is heated above ambient temperature but the downstream sensor is heated much more as a result of its proximity to the heater.

What has been shown and described is a rugged, self-contained flow detection unit requiring, for example, only 25 watts or less, at 115 volts, only two input power leads and two output signal leads. The pressure drop across the entire unit is small, no fragile devices are exposed to the fluid and the unit is essentially insensitive to check valve leakage, i.e., a "no flow" signal will continue. Further, all elements of the detector and sensing elements are physically isolated from the measured fluid and from all forces arising from flow of the measured fluid. Only appropriate continuous metal surfaces are in contact with the fluid.

Devices of the type shown in FIGURE 6 and described above are capable of detecting flow as low as 3 inches per minute. They operate in both low viscosity and high viscosity oils, are not damaged or operationally affected by entrained sand. They are capable of operating with oil-water mixtures between 100% oil and 99.9% free water.

It is possible to adjust the flow detector as desired to detect and indicate "no flow" below any arbitrarily chosen fluid flow within the flow capacity of the detector. Further, the upstream or ambient temperature sensor can be automatically compensated to adjust its calibration point slightly to account for changes in oil viscosity with ambient temperature.

The flow detector can also be utilized to measure flow rate, as distinguished from merely providing an indication of flow, provided a single fluid is used. The problem encountered with mixtures whose components vary, such as the relative content of oil and water, is that the temperature difference depends on fluid composition.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention. It is the intention, therefore, to be limited only as indicated by the scope of the following claims.

What is claimed is:

1. A flow detector for detecting a fluid flow through a conduit comprising:
   a first and second thermal sensing element positioned relative to said fluid sensing tube, said first sensing to the average temperature of a first and second portion of said conduit, said first portion being spaced and displaced downstream from said second portion relative to a fluid flow through said conduit;
   heating means positioned relative to said conduit and spaced and displaced downstream from said first portion relative to fluid flow through said conduit; and
   means operatively connected to each of said thermal sensing elements for obtaining a signal responsive to the temperature difference between said first and second portions.

2. A flow detector for detecting a fluid flow through a conduit comprising:
   a fluid transducer means operatively connected to said conduit, said fluid transducer means including a fluid sensing tube having an entrance and exit port;
   a check valve disposed adajacent the exit port of said transducer to limit fluid flow in said fluid sensing tube from said entrance to said exit port;
   a first and second thermal sensing element positioned relative to said fluid sensing tube, said first sensing element being positioned downstream from said second sensing element relative to a fluid flow through said sensing tube;
   heating means positioned relative to said fluid sensing tube closer to said first than said second thermal sensing element; and
   means operatively connected to each of said thermal sensing elements for obtaining a signal responsive to the temperature difference between the portions of said fluid sensing tube at which said thermal sensing elements are positioned.

3. A flow detector in accordance with claim 2 in which said heating element is positioned on the downstream side of said first thermal sensing element.

4. A flow detector in accordance with claim 3 wherein said fluid transducer comprises a hollow pipe member, said fluid sensing tube being positioned within said hollow pipe member, means provided between the inner wall of said hollow pipe member and the entrance and exit ports of said fluid sensing tube to force all fluid passing into said hollow pipe to flow through said fluid sensing tube thereby increasing the fluid velocity of a fluid passing through said fluid sensing tube with respect to the fluid velocity of flow passing through said conduit.

5. A flow detector in accordance with claim 4 whereby said fluid transducer is inclined at least 45° with respect to the horizon, the exit port of said sensing tube being higher with respect to the entrance port thereof.

6. A flow detector in accordance with claim 3 wherein said first and second thermal sensing elements and said heating means are positioned outside of said fluid sensing tube.

7. A flow detector in accordance with claim 3 in which said means operatively connected to said thermal sensing elements comprises a bridge circuit with said thermal sensing elements forming two branches of said bridge circuit, said bridge circuit including a pair of input terminals adapted to be connected to a source of electrical power and a pair of output terminals, and a differential amplifier means connected to said output terminals.

8. A flow detection apparatus for detecting a fluid flow through a conduit comprising:

a first and second thermal sensing device disposed relative to said conduit, said first thermal sensing device being spaced downstream from said second thermal sensing device relative to the flow of fluid through said conduit;

means for raising the ambient temperature of the conduit and fluid passing therethrough in the region spaced and displaced downstream from said first thermal sensing means; and means responsive to said first and second thermal sensing means for detecting the difference in the temperature thereof.

References Cited

UNITED STATES PATENTS

| | | | |
|---|---|---|---|
| 2,446,283 | 8/1948 | Hulsberg | 73—204 |
| 2,543,588 | 2/1951 | Nelson | 73—204 |
| 2,994,222 | 8/1961 | Laub | 73—204 |
| 3,030,806 | 4/1962 | Davis | 73—204 |
| 3,196,679 | 7/1965 | Howland | 73—204 |

FOREIGN PATENTS

| | | |
|---|---|---|
| 15,094 | 5/1914 | Great Britain. |
| 601,298 | 5/1948 | Great Britain. |
| 543,387 | 3/1956 | Italy. |
| 1,238,730 | 7/1960 | Italy. |

RICHARD C. QUEISSER, *Primary Examiner.*

EDWARD D. GILHOOLY, *Assistant Examiner.*

U.S. Cl. X.R.

340—243